US011047190B2

United States Patent
Saint Germain et al.

(10) Patent No.: US 11,047,190 B2
(45) Date of Patent: Jun. 29, 2021

(54) ADAPTIVE TRACTOR WHEEL

(71) Applicant: Halliburton Energy Services, Inc., Houston, TX (US)

(72) Inventors: Jean G. Saint Germain, Houston, TX (US); Adan Herrera, Houston, TX (US); Tanest Chinwanawich, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 16/343,714

(22) PCT Filed: Jul. 2, 2018

(86) PCT No.: PCT/US2018/040636
§ 371 (c)(1),
(2) Date: Apr. 19, 2019

(87) PCT Pub. No.: WO2020/009692
PCT Pub. Date: Jan. 9, 2020

(65) Prior Publication Data
US 2020/0256146 A1  Aug. 13, 2020

(51) Int. Cl.
*E21B 23/14* (2006.01)
*E21B 23/00* (2006.01)
(Continued)

(52) U.S. Cl.
CPC ............ *E21B 23/14* (2013.01); *E21B 23/001* (2020.05); *E21B 41/00* (2013.01); *B60C 7/14* (2013.01);
(Continued)

(58) Field of Classification Search
CPC .... B60C 7/06; B60C 7/10; B60C 7/14; B60C 7/16; B60C 7/18; B60C 7/20; B60C 2007/107; E21B 23/001
See application file for complete search history.

(56) References Cited

U.S. PATENT DOCUMENTS 1,363,951 A * 12/1920 Bostwick ................. B60C 7/16
                                                              152/259
4,192,360 A    3/1980 Rodriquez
(Continued)

FOREIGN PATENT DOCUMENTS

KR      1019790000839 B1    7/1979

OTHER PUBLICATIONS

D. Mosher; "Mars destroys tires—so NASA reinvented the wheel by giving it a memory", Business Insider; Nov. 27, 2017; https ://www. businessinsider .com/nasa-memory-meta-wheels-mars-rovers-201 7-11.
(Continued)

*Primary Examiner* — Robert E Fuller
*Assistant Examiner* — Lamia Quaim
(74) *Attorney, Agent, or Firm* — McGuireWoods LLP

(57) ABSTRACT

Provided are tractor wheels for a downhole tractor. An example tractor wheel comprises a series of continuous springs disposed on the circumference of the tractor wheel, wherein the individual continuous springs in the series of continuous springs are separated by a gap, and a void disposed on the interior of the tractor wheel and that is continuous about the circumference of the tractor wheel.

20 Claims, 9 Drawing Sheets

(51) Int. Cl.
- *B60C 7/16* (2006.01)
- *E21B 41/00* (2006.01)
- *E21B 4/18* (2006.01)
- *E21B 43/116* (2006.01)
- *E21B 47/12* (2012.01)
- *B60C 7/14* (2006.01)
- *B60C 11/00* (2006.01)

(52) U.S. Cl.
CPC ................ *B60C 7/16* (2013.01); *B60C 11/00* (2013.01); *E21B 4/18* (2013.01); *E21B 43/116* (2013.01); *E21B 47/12* (2013.01)

(56) References Cited

U.S. PATENT DOCUMENTS

| | | |
|---|---|---|
| 4,862,808 A | 9/1989 | Hedgcoxe et al. |
| 6,273,189 B1 | 8/2001 | Gissler et al. |
| 7,172,026 B2 | 2/2007 | Misselbrook |
| D699,267 S | 2/2014 | Nelson |
| 9,157,287 B2 | 10/2015 | Slocum et al. |
| 2012/0223497 A1 | 9/2012 | Radziszewski et al. |
| 2012/0247635 A1 | 10/2012 | Manesh et al. |
| 2014/0013731 A1* | 1/2014 | Hallundbæk ........... E21B 23/14 60/325 |
| 2014/0116729 A1 | 5/2014 | Al-Mulhem |

OTHER PUBLICATIONS

Schlumberger, "MaxPull High-pull wireline conveyance system", http://www.slb.com/~/media/Files/evaluation/brochures/wireline open hole/wireline high tension conveyance br.pdf.

International Search Report and Written Opinion for corresponding International Application No. PCT/US2018/040636 dated Apr. 1, 2019; 14 pages.

* cited by examiner

ADAPTIVE TRACTOR WHEEL

TECHNICAL FIELD

The present disclosure relates to tractor wheels for wellbore conduits, and more particularly, to an adaptive tractor wheel capable of deforming and adapting to the surface of a wellbore conduit to improve traction and preserve the integrity of the surface of the conduit.

BACKGROUND

In horizontal or deviated sections of a wellbore, the conveyance of tubing and wireline tools may be difficult because gravity may not be relied upon to assist in propelling the tubing or wireline tool as is done in vertical sections of a wellbore. In the horizontal or deviated sections of the wellbore, the tubing or wireline tool may become lodged in the wellbore preventing forward progress. This may occur from contact friction with an adjacent surface or from buckling/coiling of the wireline or tubing.

Downhole tractors may be used to facilitate the conveyance of wireline assemblies and tubing in the horizontal or deviated sections of the wellbore. Downhole tractors engage the inner walls of a wellbore conduit (e.g., the casing, tubing, piping, or the wellbore wall of an open-hole portion of the wellbore). The downhole tractor may be used to propel any portion of a tubing or a wireline connected thereto to a desired location in the wellbore.

The downhole tractor uses wheels to propel itself along the adjacent contact surface of the conduit with which it is engaged. These wheels have to maintain traction with the adjacent contact surface in order to propel the tubing or wireline in the conduit. If the tractor wheel does not maintain sufficient traction to propel the tubing or wireline, it may slip. If slippage occurs, more pressure may be applied to the tractor wheel against the contact surface to reduce slippage of the tractor wheel. However, adding pressure to the tractor wheel may shorten the life of the tractor wheel and may damage the contact surface of the conduit due to the high stress applied at this area of the conduit. Damaging the surface of the conduit may reduce the integrity of the surface of the conduit over time. For example, leaks and cracks may develop in the damaged surface of the conduit. In some extreme instances, damage to the surface of the conduit could result in failure of the conduit. Moreover, the increasing stress at the contact surface of the tractor wheel results in a faster rate of wheel degradation. This may necessitate replacing tractor wheels more frequently.

Failure to reduce slippage and/or minimize the damage to the surface of the conduit can result in an increase in non-productive time as well as in operation expenditures for subsequent operations.

BRIEF DESCRIPTION OF THE DRAWINGS

Illustrative examples of the present disclosure are described in detail below with reference to the attached drawing figures, which are incorporated by reference herein, and wherein.

Figure 1B:
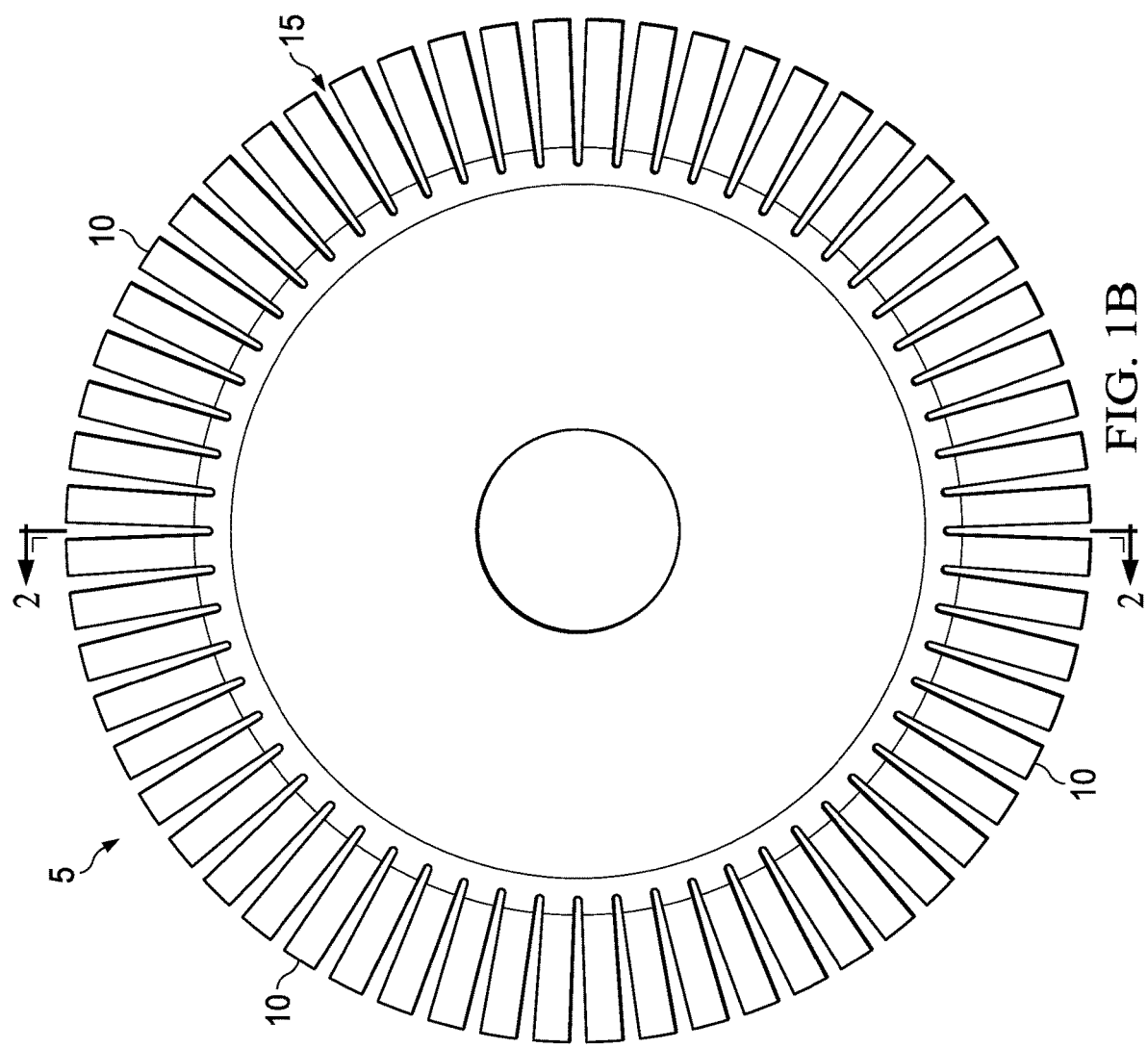
FIG. 1B is another illustration of an orthogonal view of the example tractor wheel of FIG. 1A, except that the illustration of FIG. 1B is rotated 90° along line A-A of the illustration of FIG. 1A in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates to tractor wheels for wellbore conduits, and more particularly, to an adaptive tractor wheel capable of deforming and adapting to the surface of a wellbore conduit to improve traction and preserve the integrity of the surface of the conduit.

In the following detailed description of several illustrative examples reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the methods and systems described herein relate to an adaptive tractor wheel capable of deforming and adapting to the surface of a wellbore conduit. Advantageously, the tractor wheel improves traction at the contact surface of the conduit. This improved traction may result in reduced slippage of the downhole tractor. Further, the tractor wheel deforms to better grip the surface of the conduit. As such, the footprint of the tractor wheel may increase as it adapts to the surface of the conduit. Adaptively increasing the footprint of the tractor wheel may result in a relative reduction of the overall pressure needed to sufficiently grip the contact surface of the conduit. This advantage may result in improving the longevity of the tractor wheel and minimizing damage to the surface of the conduit.

Figure 1A:
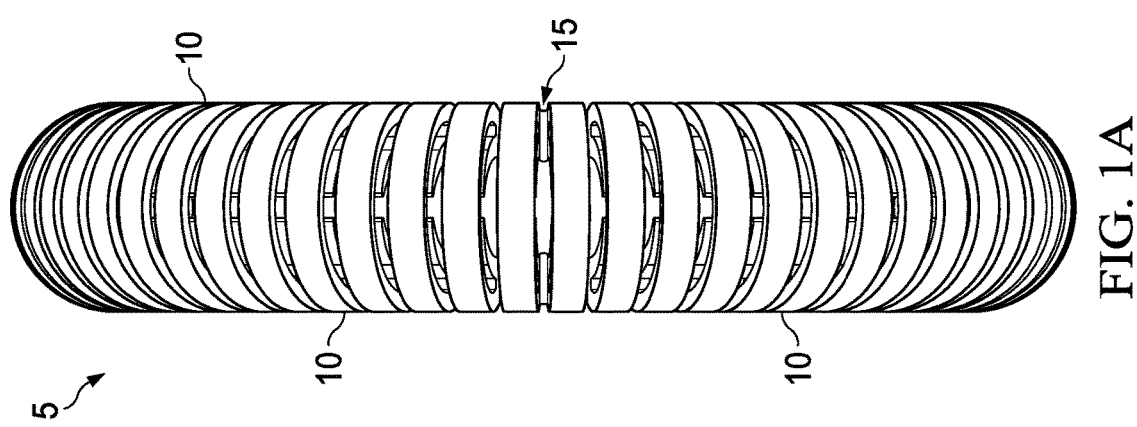
FIG. 1A is an illustration of an orthogonal view of an example tractor wheel in accordance with one or more examples described herein.
Figure 1C:
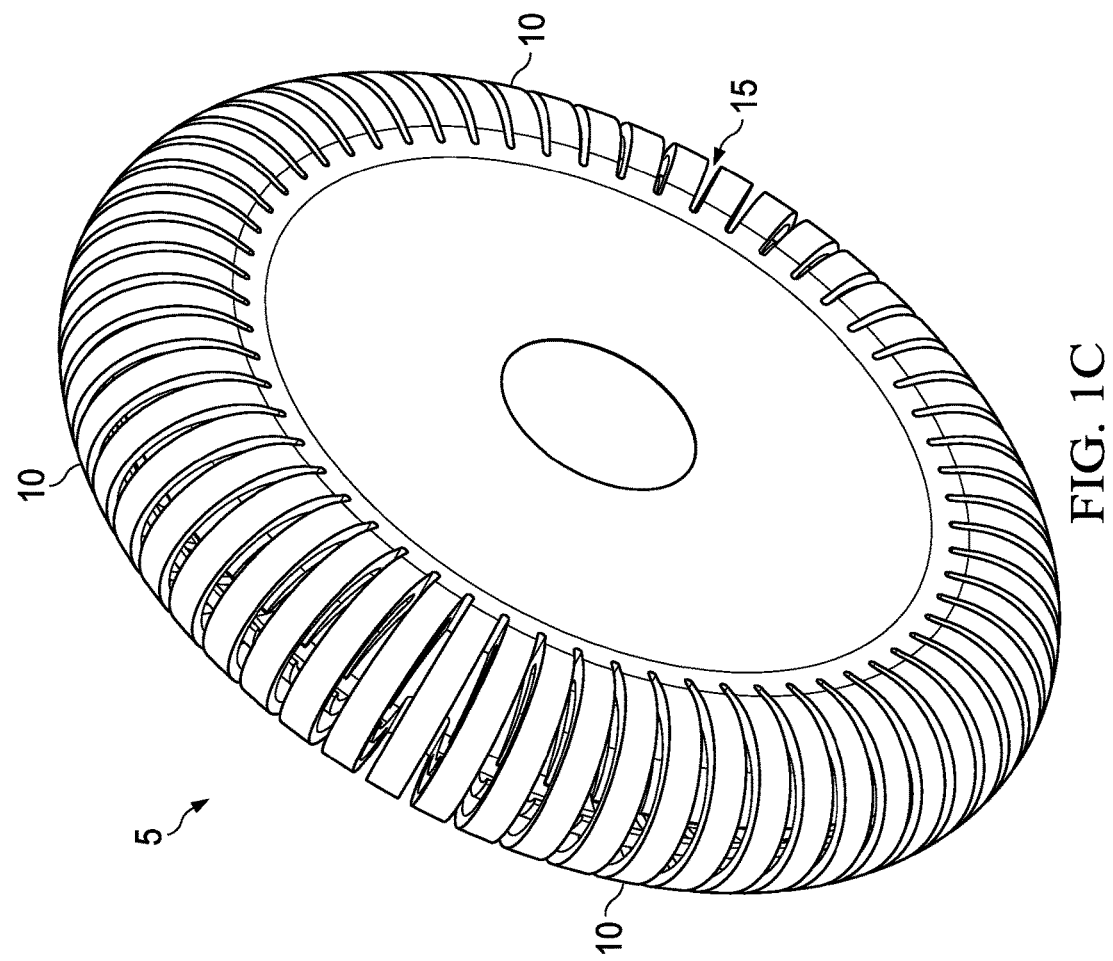
FIG. 1C is an illustration of an isometric view of the example tractor wheel of FIGS. 1A and 1B in accordance with one or more examples described herein.

FIG. 1A is an illustration of an orthogonal view of an example tractor wheel 5. The tractor wheel 5 comprises a series of curved continuous springs 10 disposed along the circumference of the tractor wheel 5. The individual continuous springs 10 are separated by gaps 15. FIG. 1B is another illustration of an orthogonal view of the example tractor wheel 5, except that the illustration of FIG. 1B is rotated 90° along line A-A of the illustration of FIG. 1A. FIG. 1B further illustrates an inset to enlarge the illustration of the gap 15. FIG. 1C is an illustration of an isometric view of the example tractor wheel 5. Each of the continuous springs 10 is positioned around the circumference of the tractor wheel 5 and are curved along the width of the tractor wheel 5. The gaps 15 separate the individual continuous springs 10 along the circumference and also extend along the width of the tractor wheel 5. The separation of the individual continuous springs 10 allows for the individual elastic deformation of each continuous spring 10. The continuous springs 10 may elastically deform when pressure is applied, and then they may regain their illustrated default shape after said pressure is removed.

Figure 2:
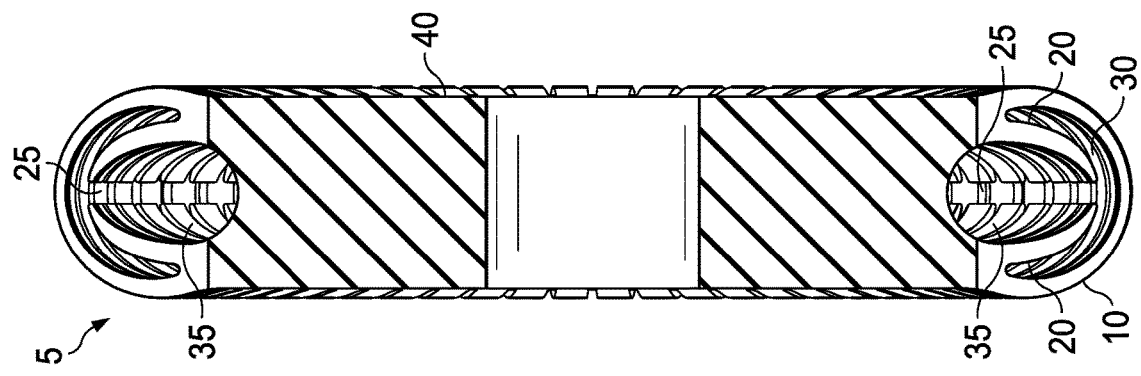
FIG. 2 is an illustration of a cross-section of the example tractor wheel of FIGS. 1A-1C in accordance with one or more examples described herein.

FIG. 2 is an illustration of a cross-section of the example tractor wheel 5. As illustrated, the continuous springs 10 are disposed on the exterior of the tractor wheel 5. On the interior of tractor wheel 5 is disposed a series of discontinuous springs 20, the series extending generally around the circumference of the tractor wheel 5 similarly to the continuous springs 10. Although not visible from this perspective, the individual discontinuous springs 20 in the series are also separated from each other by gap 15. The discontinuous springs 20 are noted as being discontinuous in that there is an additional gap, illustrated as gap 25, which bifurcates the discontinuous springs 20, thereby separating each discontinuous spring 20 into two independent members that face each other across gap 25. This inner series of discontinuous springs 20 are disposed on the interior of the tractor wheel 5, and the exterior continuous springs 10 may engage these interior discontinuous springs 20 for additive stiffness if a higher pressure is applied.

Separating the exterior continuous springs 10 from the interior discontinuous springs 20 is a void 30. Void 30 extends along the circumference of the tractor wheel 5 and provides a void space in which the continuous springs 10 may be displaced when they are elastically deformed under pressure. Inward of the discontinuous springs 20 is an additional void 35. The void 35 provides a void space in which the discontinuous springs 20 may be displaced when they are elastically deformed under pressure. In some alternative examples, void 35 may not comprise a void space, but instead may comprise a filler material having a sufficient shape memory. The filler material may comprise a rubber and/or a rubber and metal composite. The metal may be a metal alloy. For example, the rubber and metal composite may comprise a rubber having metal particulates distributed throughout to increase the stiffness of the rubber. In another example, the rubber and metal composite may comprise a continuous and/or discontinuous wire mesh having rubber embedded and distributed throughout. Any material having a desired stiffness and shape memory may be used as a filler material for void 35. With the benefit of this disclosure, one of ordinary skill in the art will be readily able to select an appropriate filler material for the void 35.

Hub 40 is disposed at the center of the tractor wheel 5. Hub 40 may be coupled to an axle (not illustrated) extending through the axis of the tractor wheel 5. Tractor wheel 5 may then be able to rotate about the axle.

The tractor wheel 5 may comprise any material sufficient for the desired applications of tractor wheel 5. For example, tractor wheel 5 may comprise such materials including, but not limited to, a rubber, a rubber and metal composite, or any combination thereof. With the benefit of this disclosure, one of ordinary skill in the art will be readily able to select an appropriate material for the tractor wheel 5 to perform a desired operation.

It should be clearly understood that the example of tractor wheel 5 illustrated by FIGS. 1A-2 is merely a general application of the principles of this disclosure in practice, and a wide variety of other examples are possible. Therefore, the scope of this disclosure is not limited in any manner to the details of FIGS. 1A-2 as described herein.

Figure 3B:
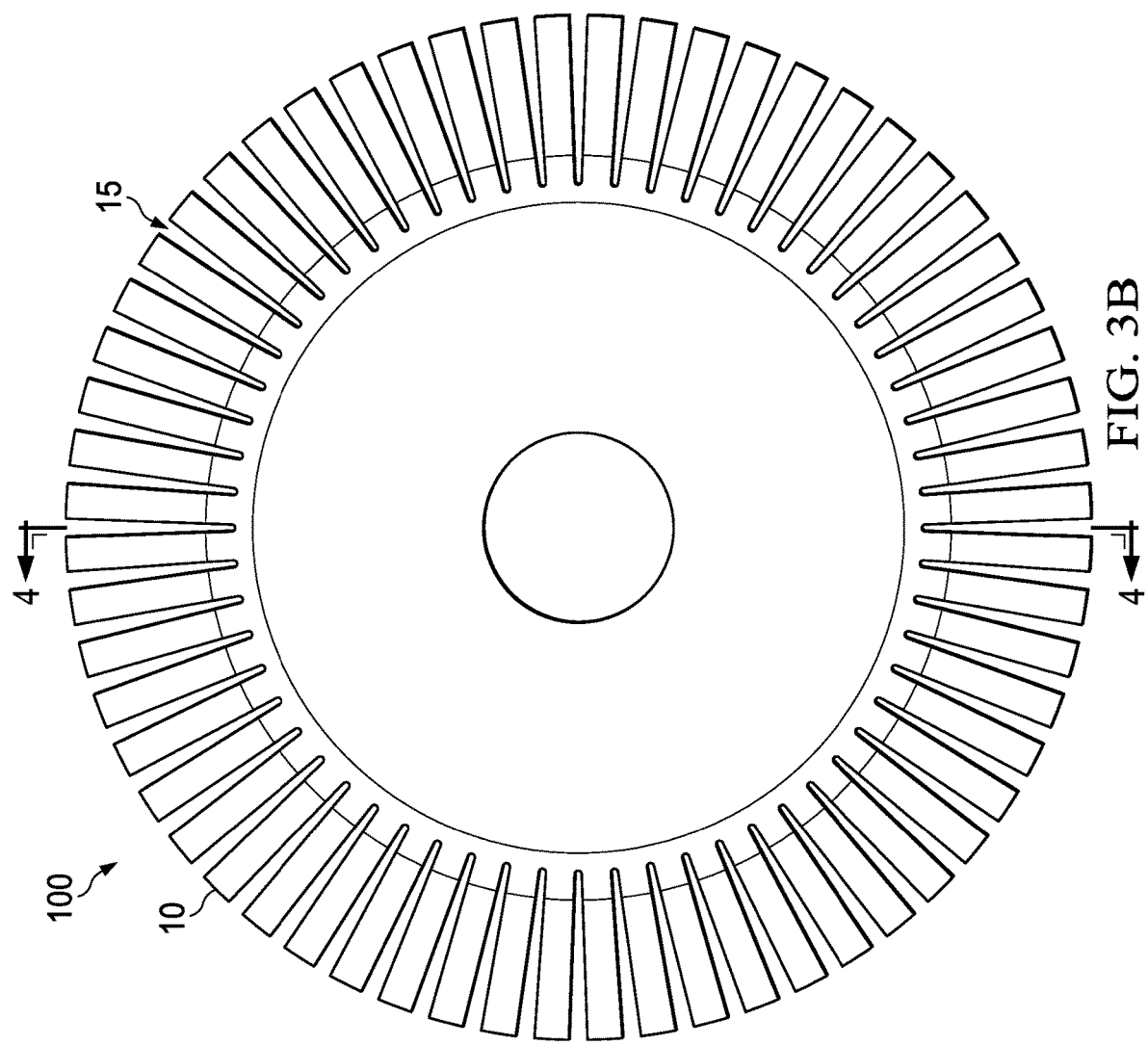
FIG. 3B is another illustration of an orthogonal view of the example tractor wheel of FIG. 3A, except that the illustration of FIG. 3B is rotated 90° along line D-D of the illustration of FIG. 3A in accordance with one or more examples described herein.
Figure 3A:
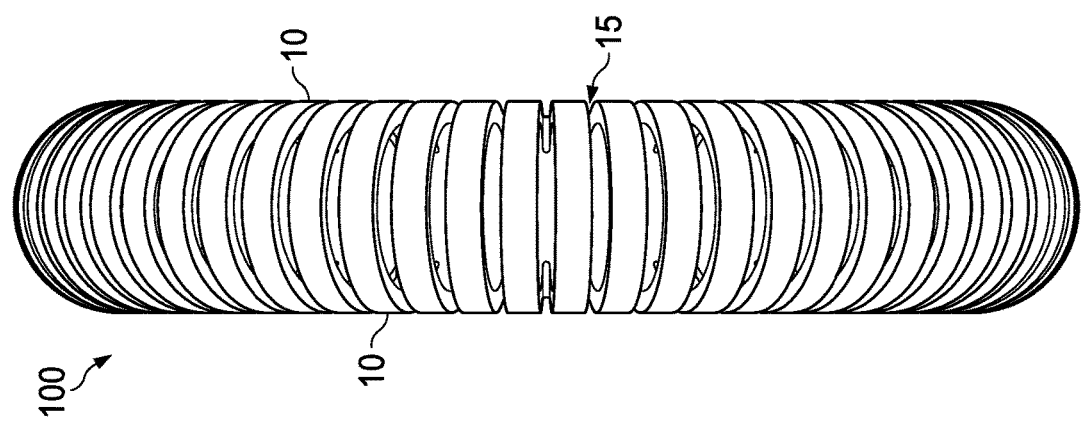
FIG. 3A is an illustration of an orthogonal view of another example tractor wheel in accordance with one or more examples described herein.

FIG. 3A is an illustration of an orthogonal view of another example tractor wheel 100. The tractor wheel 100 comprises a series of curved continuous springs 10 disposed along the circumference of the tractor wheel 100 analogous to the series of curved continuous springs 10 described above with respect to example tractor wheel 5 as illustrated in FIGS. 1A-2. The individual continuous springs 10 are separated by gaps 15. The gaps 15 are analogous to the gaps 15 described above with respect to example tractor wheel 5 as illustrated in FIGS. 1A-2.

Figure 3C:
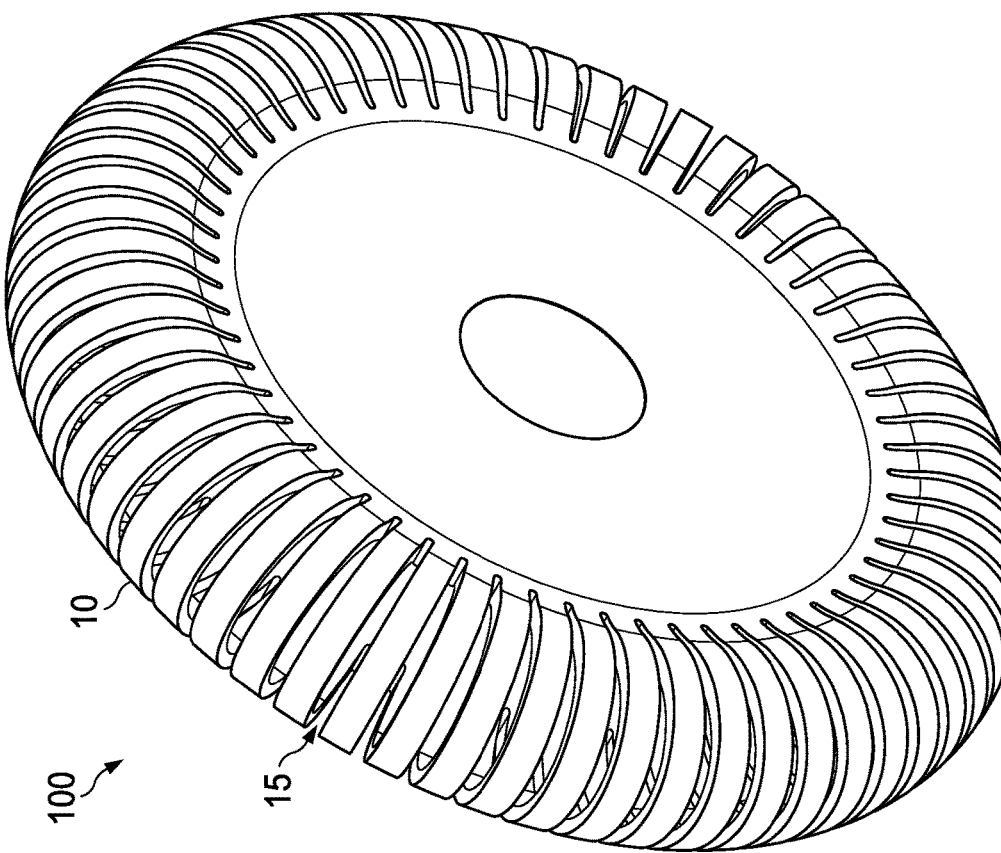
FIG. 3C is an illustration of an isometric view of the example tractor wheel of FIGS. 3A and 3B in accordance with one or more examples described herein.

FIG. 3B is another illustration of an orthogonal view of the example tractor wheel 100, but the illustration of FIG. 3B is rotated 90° along line D-D of the illustration of FIG. 3A. FIG. 3C is an illustration of an isometric view of the example tractor wheel 100.

Figure 4:
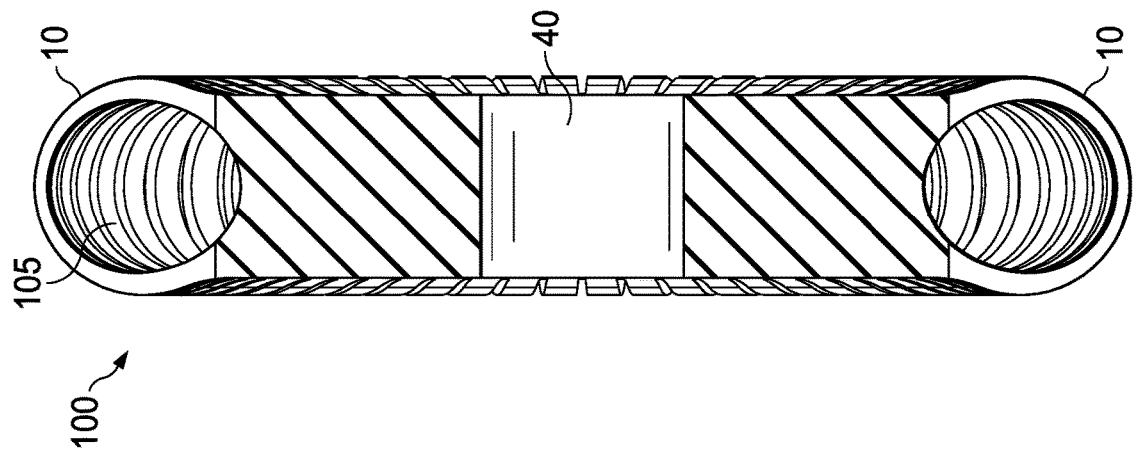
FIG. 4 is an illustration of a cross-section of the example tractor wheel of FIGS. 3A-3C in accordance with one or more examples described herein.

FIG. 4 is an illustration of a cross-section of the example tractor wheel 100. Tractor wheel 100 is similar to the tractor wheel 5 illustrated in FIGS. 1A-2 except that tractor wheel 100 does not comprise a series of discontinuous springs. Disposed on the interior of the tractor wheel 100 is a void 105. Void 105 extends along the circumference of the tractor wheel 100 and provides a void space in the interior of tractor wheel 100 in which the continuous springs 10 may be displaced when they are elastically deformed under pressure. In some alternative examples, void 105 may not comprise a void space, but instead may comprise a filler material having a sufficient shape memory. The filler material may comprise a rubber and/or a rubber and metal composite. The metal may be a metal alloy. For example, the rubber and metal composite may comprise a rubber having metal particulates distributed throughout to increase the stiffness of the rubber. In another example, the rubber and metal composite may comprise a continuous and/or discontinuous wire mesh having rubber embedded and distributed throughout. Any material having a desired stiffness and shape memory may be used as a filler material for void 105. With the benefit of this disclosure, one of ordinary skill in the art will be readily able to select an appropriate filler material for the void 105.

Hub 40 is disposed at the center of the tractor wheel 100. Hub 40 may be coupled to an axle (not illustrated) extending through the axis of the tractor wheel 100. The tractor wheel 100 may then be able to rotate about the axle.

The tractor wheel 100 may comprise any material sufficient for the desired applications of tractor wheel 100. For example, tractor wheel 100 may comprise such materials including, but not limited to, a rubber, a rubber and metal composite, or any combination thereof. With the benefit of this disclosure, one of ordinary skill in the art will be readily able to select an appropriate material for the tractor wheel 100 to perform a desired operation.

It should be clearly understood that the example of tractor wheel 100 illustrated by FIGS. 3A-4 is merely a general application of the principles of this disclosure in practice, and a wide variety of other examples are possible. Therefore, the scope of this disclosure is not limited in any manner to the details of FIGS. 3A-4 as described herein.

Figure 5B:
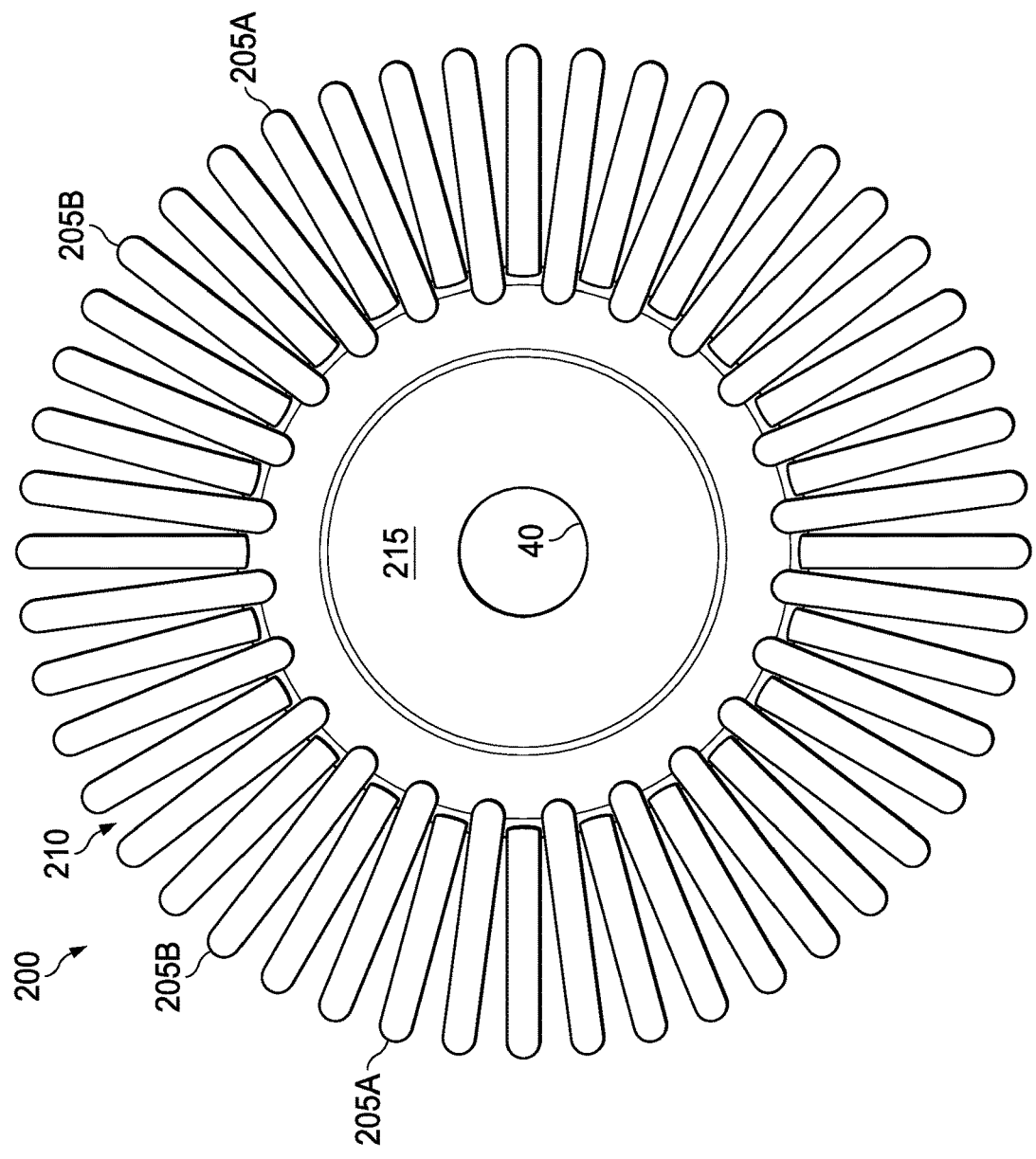
FIG. 5B is another illustration of an orthogonal view of the example tractor wheel of FIG. 5A, except that the illustration of FIG. 5B is rotated 90° along line C-C of the illustration of FIG. 5A in accordance with one or more examples described herein.
Figure 5A:
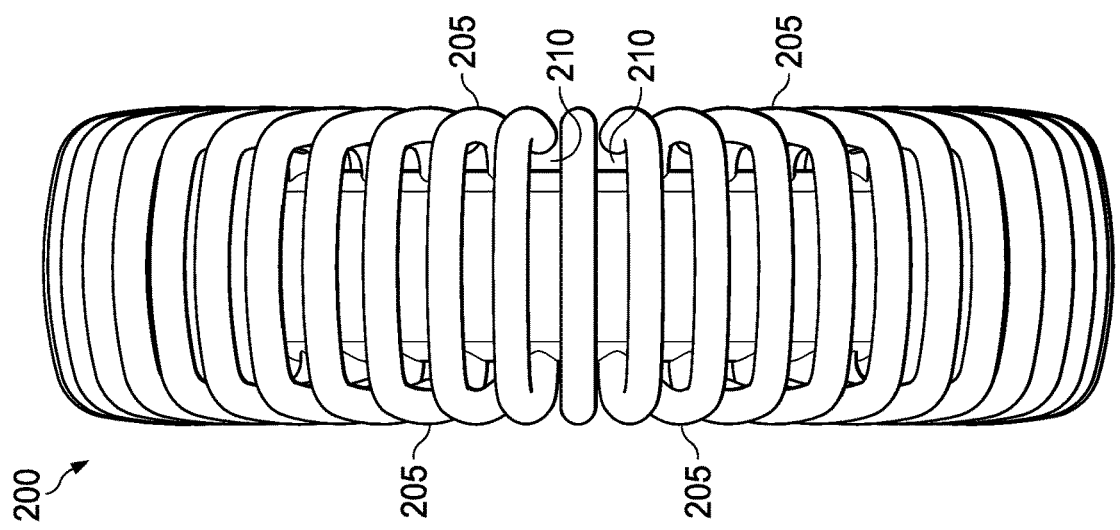
FIG. 5A is an illustration of an orthogonal view of another example tractor wheel in accordance with one or more examples described herein.

FIG. 5A is an illustration of an orthogonal view of an example tractor wheel 200. The tractor wheel 200 comprises a series of curved wire springs 205 disposed along the circumference of the tractor wheel 200. The wire springs 205 are separated by gaps 210. FIG. 5B is another illustration of an orthogonal view of the example tractor wheel 200, but the illustration of FIG. 5B is rotated 90° along line C-C of the illustration of FIG. 5A. As can be viewed from this perspective, the wire springs 205 comprise two subtypes distinguished by whether they are fixed to a body 215 of the tractor wheel 200 or whether they hang free of attachment to the body 215 of the tractor wheel 200. Wire springs 205A are not coupled to the body 215 of the tractor wheel 200 and are allowed to hang free of it. Wire springs 205B may be coupled to the body 215 of the tractor wheel 200. For example, the wire springs 205B may be welded or coupled via a threaded connection to the body 215. The wire springs 205B may be continuous and independently comprise a loop passing through the body 215 at the coupling point. Alternatively, the wire springs 205B may be discontinuous and be connected to the body 215 at the point of separation. The wire springs 205A are discontinuous and are separated at the portion which hangs free of the body 215 as illustrated in FIG. 2C. FIG. 2C is an illustration of an isometric view of the example tractor wheel 200. Each of the wire springs 205 is positioned around the circumference of the tractor wheel 200 and is curved along the width of the tractor wheel 200. Gaps 210 separate the individual wire springs 205 along the circumference and also extend along the width of the tractor wheel 200. The separation of the individual wire springs 205 allows for the individual elastic deformation of each wire spring 205. The wire springs 205 may elastically deform when pressure is applied, and then they may regain their illustrated default shape after said pressure is removed.

Figure 5C:
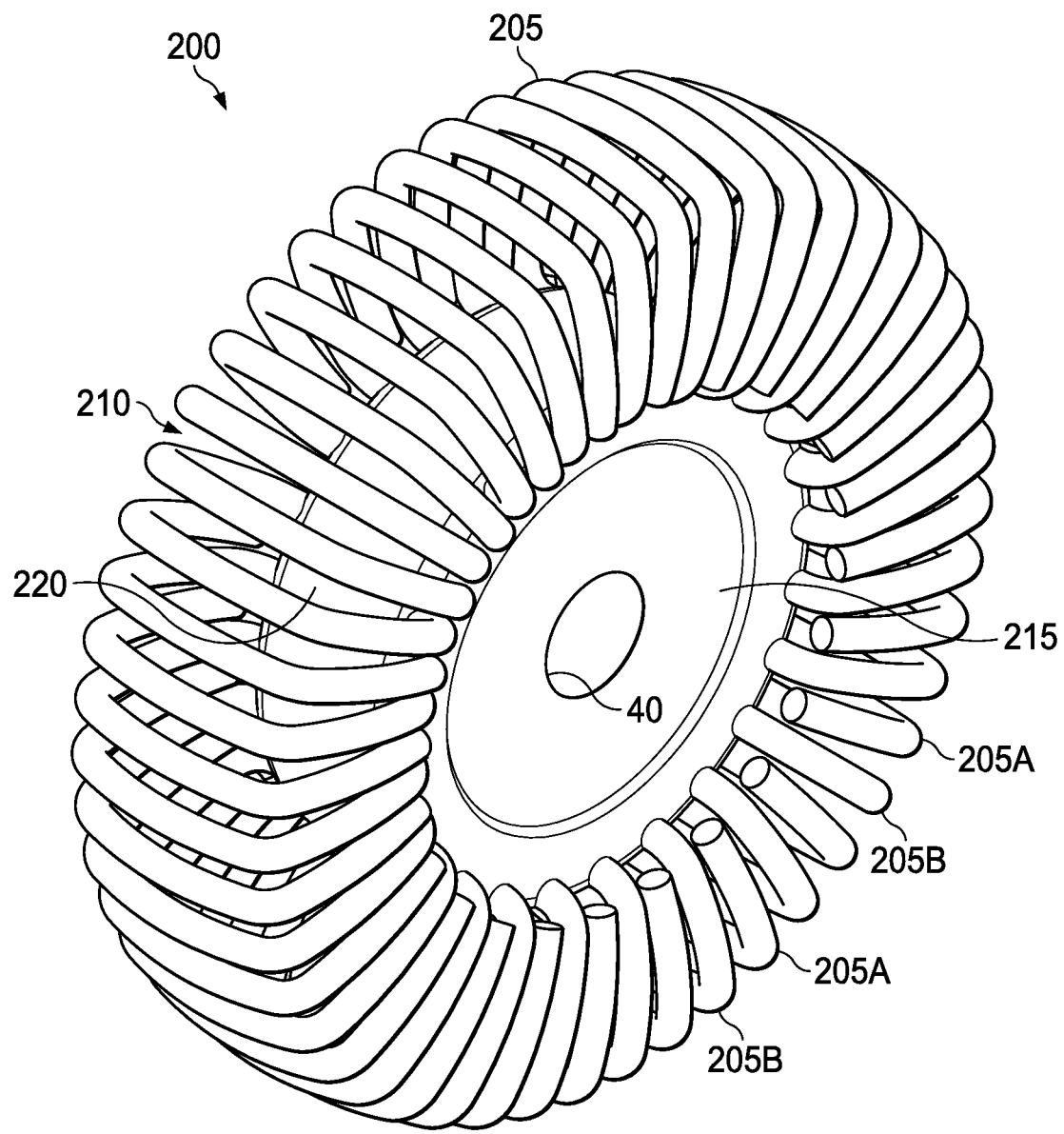
FIG. 5C is an illustration of an isometric view of the example tractor wheel of FIGS. 5A and 5B in accordance with one or more examples described herein.

With continued reference to FIG. 5C, disposed on the interior of the wire springs 205 is a void 220. Void 220 extends along the circumference of the tractor wheel 200 and provides a void space into which the wire springs 205 may be displaced when they are elastically deformed under pressure. In some alternative examples, void 220 may not comprise a void space, but instead may comprise a filler material having a sufficient shape memory. The filler material may comprise a rubber and/or a rubber and metal composite. The metal may be a metal alloy. For example, the rubber and metal composite may comprise a rubber having metal particulates distributed throughout to increase the stiffness of the rubber. In another example, the rubber and metal composite may comprise a continuous and/or discontinuous wire mesh having rubber embedded and distributed throughout. Any material having a desired stiffness and shape memory may be used as a filler material for void 220. With the benefit of this disclosure, one of ordinary skill in the art will be readily able to select an appropriate filler material for the void 220.

With reference to FIGS. 5B and 5C, hub 40 is disposed at the center of the tractor wheel 200. Hub 40 may be coupled to an axle (not illustrated) extending through the axis of the tractor wheel 200. The tractor wheel 200 may then be able to rotate about the axle.

The tractor wheel 200 may comprise any material sufficient for a desired application of tractor wheel 200. For example, tractor wheel 200 may comprise such materials including, but not limited to, a rubber, a rubber and metal composite, or any combination thereof. With the benefit of this disclosure, one of ordinary skill in the art will be readily able to select an appropriate material for the tractor wheel 200 to perform a desired operation.

It should be clearly understood that the example of tractor wheel 200 illustrated by FIGS. 5A-5C is merely a general application of the principles of this disclosure in practice, and a wide variety of other examples are possible. Therefore, the scope of this disclosure is not limited in any manner to the details of FIGS. 5A-5C as described herein.

Another aspect of tractor wheel design is the pattern of the tread. The tread design may affect the size of the contact surface of the tractor wheel, the traction of the tractor wheel, the ability of the tractor wheel to displace debris in the path of the tractor wheel, and/or the degree of damage the tractor wheel may impart to the conduit. For example, if a tread does not provide sufficient surface area at the contact surface, the tractor wheel may slip. As another example, if the tread has sharp edges or teeth it may damage the surface of the conduit by making impressions or divots in the surface of the conduit.

Figure 6B:
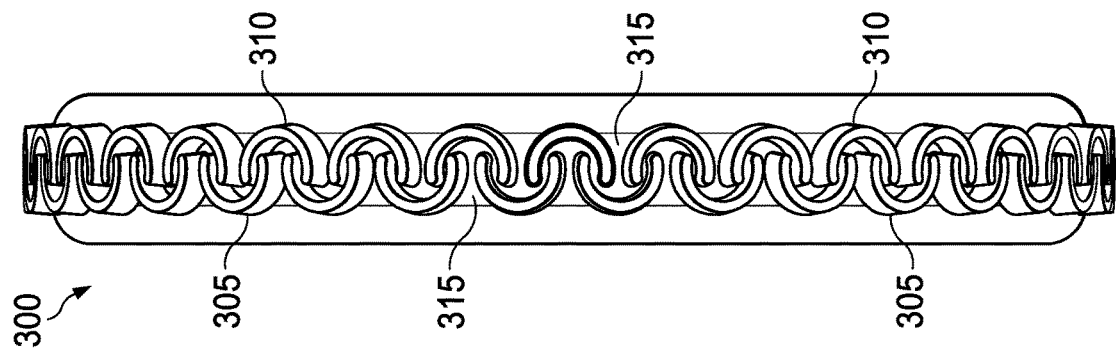
FIG. 6B is an illustration of an orthogonal view of the example tractor tread of FIG. 6A fitted on to the tractor wheel of FIGS. 1A-2 in accordance with one or more examples described herein.
Figure 6A:
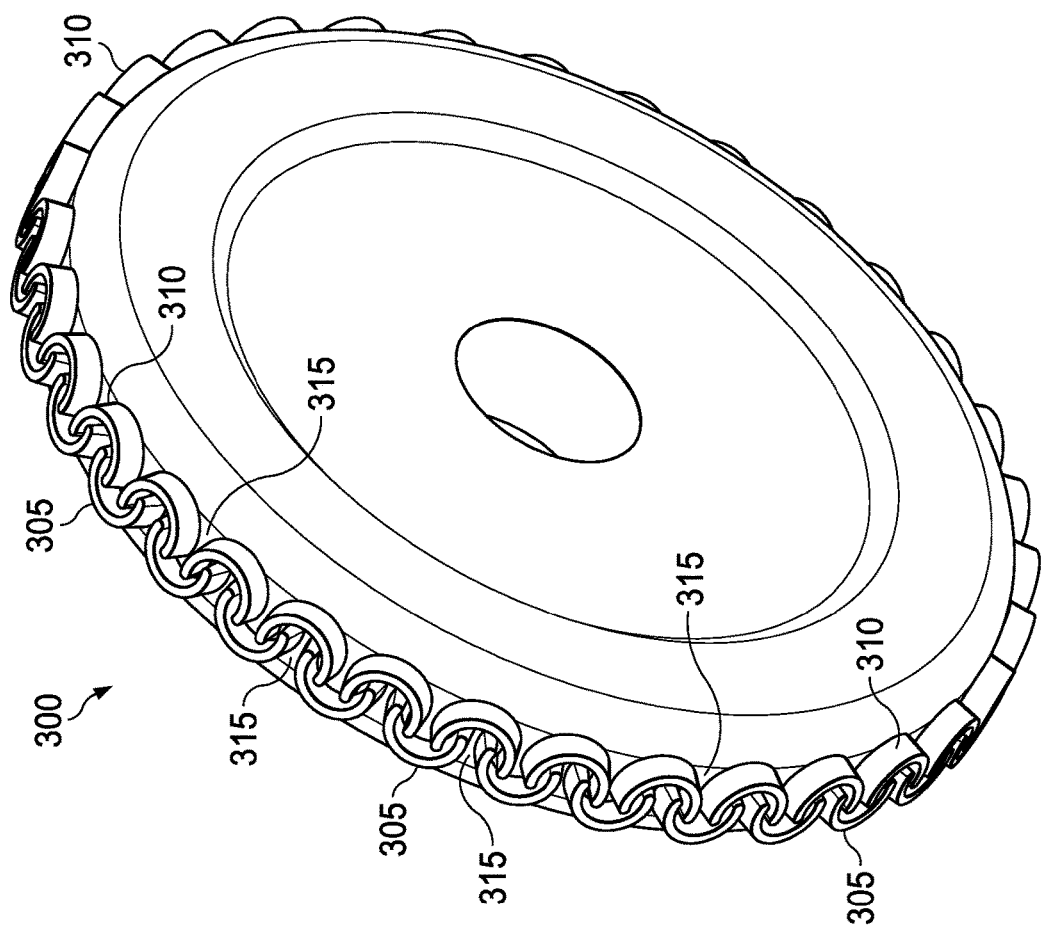
FIG. 6A is an illustration of an isometric view of an example tractor tread fitted on to the tractor wheel of FIGS. 1A-2 in accordance with one or more examples described herein.

FIG. 6A is an illustration of an isometric view of an example tractor tread 300 fitted on to a tractor wheel 5 as illustrated in FIGS. 1A-2. FIG. 6B is an illustration of an orthogonal view of an example tractor tread 300 fitted on to a tractor wheel 5 as illustrated in FIGS. 1A-2.

Tractor tread 300 comprises a series of alternating forward-facing raised curves 305 and backward-facing raised curves 310. The terminal ends of each forward-facing raised curve 305 is disposed in the open bend of each adjacent backward-facing raised curve 310. The terminal ends of each backward-facing raised curve 310 is disposed in the open bend of each adjacent forward-facing raised curve 305. As such, the mirror image forward-facing raised curves 305 and the backward-facing raised curves 310 are slightly offset from each other as illustrated. Although the forward-facing raised curves 305 and backward-facing raised curves 310 are illustrated as generally having a C-shape and an inverse C-shape respectively, it is to be understood that the degree of curvature can vary as desired. Debris paths 315 are flow paths for the displacement of debris which may occur in the path of the tractor wheel 5. In some optional examples, the edges of the forward-facing raised curves 305 and the backward-facing raised curves 310 may be tapered from the base to the tip. All or a portion of the edges may be tapered. For example, only the edges of the terminal ends of the forward-facing raised curves 305 and the backward-facing raised curves 310 may be tapered. As another example, every edge of the forward-facing raised curves 305 and the backward-facing raised curves 310 may be tapered. As illustrated by FIGS. 6A and 6B, the forward-facing raised curves 305 and the backward-facing raised curves 310 do not comprise sharp points or edges and as such, may prevent or reduce damage to the conduit surface and may prolong the life of the tractor wheel 5 as sharp points and edges may wear at a greater rate relative to tread patterns comprising blunted edges.

Although FIGS. 6A and 6B illustrate tractor tread 300 as used with tractor wheel 5, it is to be understood that tractor tread 300 may be used on any tractor wheel (e.g., tractor wheel 100 and tractor wheel 200 as were illustrated in FIGS. 3A-5C), as well as any other tractor wheel, whether or not described herein.

The tractor tread 300 may comprise any material sufficient for a desired application of the tractor tread 300. For example, tractor tread 300 may comprise such materials including, but not limited to, a rubber, a rubber and metal composite, or any combination thereof. With the benefit of this disclosure, one of ordinary skill in the art will be readily able to select an appropriate material for the tractor tread 300 to perform a desired operation.

It should be clearly understood that the example of tractor tread 300 illustrated by FIGS. 6A and 6B is merely a general application of the principles of this disclosure in practice, and a wide variety of other examples are possible. Therefore, the scope of this disclosure is not limited in any manner to the details of FIGS. 6A and 6B as described herein.

Figure 7B:
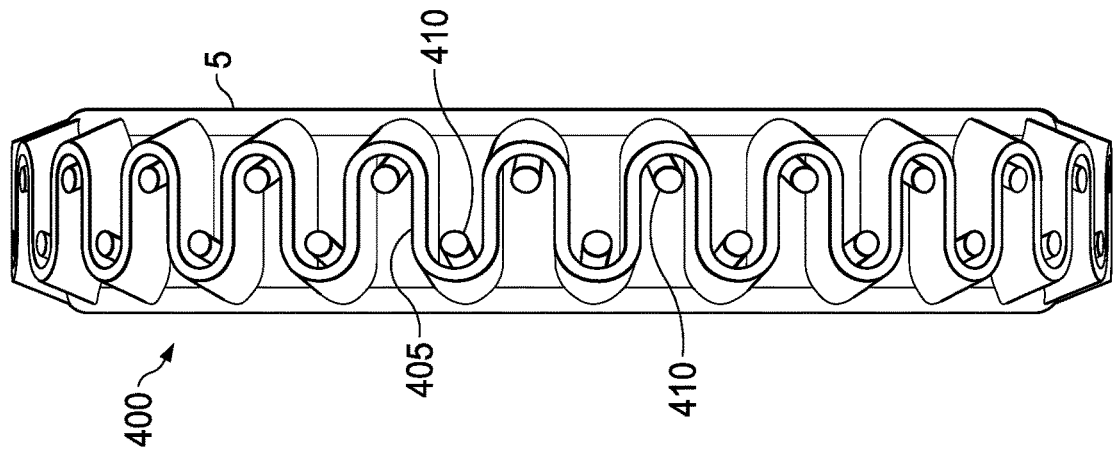
FIG. 7B is an illustration of an orthogonal view of the example tractor tread of FIG. 7A fitted on to the tractor wheel of FIGS. 1A-2 in accordance with one or more examples described herein.
Figure 7A:
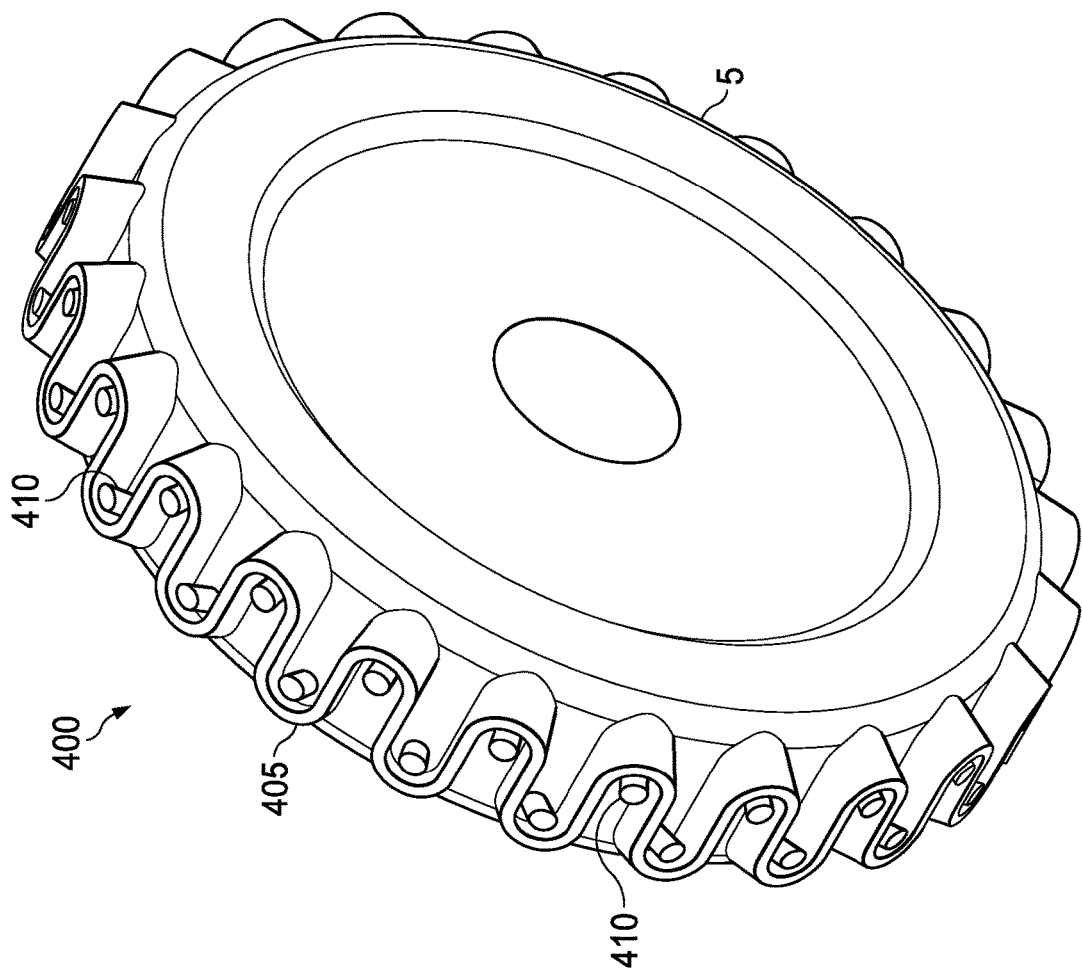
FIG. 7A is an illustration of an isometric view of an example tractor tread fitted on to the tractor wheel of FIGS. 1A-2 in accordance with one or more examples described herein.

FIG. 7A is an illustration of an isometric view of another example tractor tread 400 fitted on to a tractor wheel 5, as illustrated in FIGS. 1A-2. FIG. 7B is an illustration of an orthogonal view of an example tractor tread 400 fitted on to the tractor wheel 5, as illustrated in FIGS. 1A-2. Tractor tread 400 comprises a continuous serpentine-shaped raised curve 405 with raised posts 410 disposed in each open bend. The degree of curvature of the serpentine-shape can vary as desired. In some optional examples, the edges of the serpentine-shaped raised curve 405 and the raised posts 410 may be tapered from the base to the tip. All or a portion of the edges may be tapered. As illustrated by FIGS. 7A and 7B, the serpentine-shaped raised curve 405 and the raised posts 410 do not comprise sharp points or edges and as such, may reduce the damage to the conduit surface and may prolong the life of the tractor wheel 5.

Although FIGS. 7A and 7B illustrate tractor tread 400 as used with tractor wheel 5, it is to be understood that tractor tread 400 may be used on any tractor wheel (e.g., the tractor wheel 100 and the tractor wheel 200 that were illustrated in FIGS. 3A-5C), as well as any other tractor wheel, whether or not described herein.

The tractor tread 400 may comprise any material sufficient for a desired application of tractor tread 400. For example, the tractor tread 400 may comprise such materials including, but not limited to, a rubber, a rubber and metal composite, or any combination thereof. With the benefit of this disclosure, one of ordinary skill in the art will be readily able to select an appropriate material for the tractor tread 400 to perform a desired operation.

It should be clearly understood that the example of tractor tread 400 illustrated by FIGS. 7A and 7B is merely a general application of the principles of this disclosure in practice, and a wide variety of other examples are possible. Therefore, the scope of this disclosure is not limited in any manner to the details of FIGS. 7A and 7B as described herein.

Figure 8:
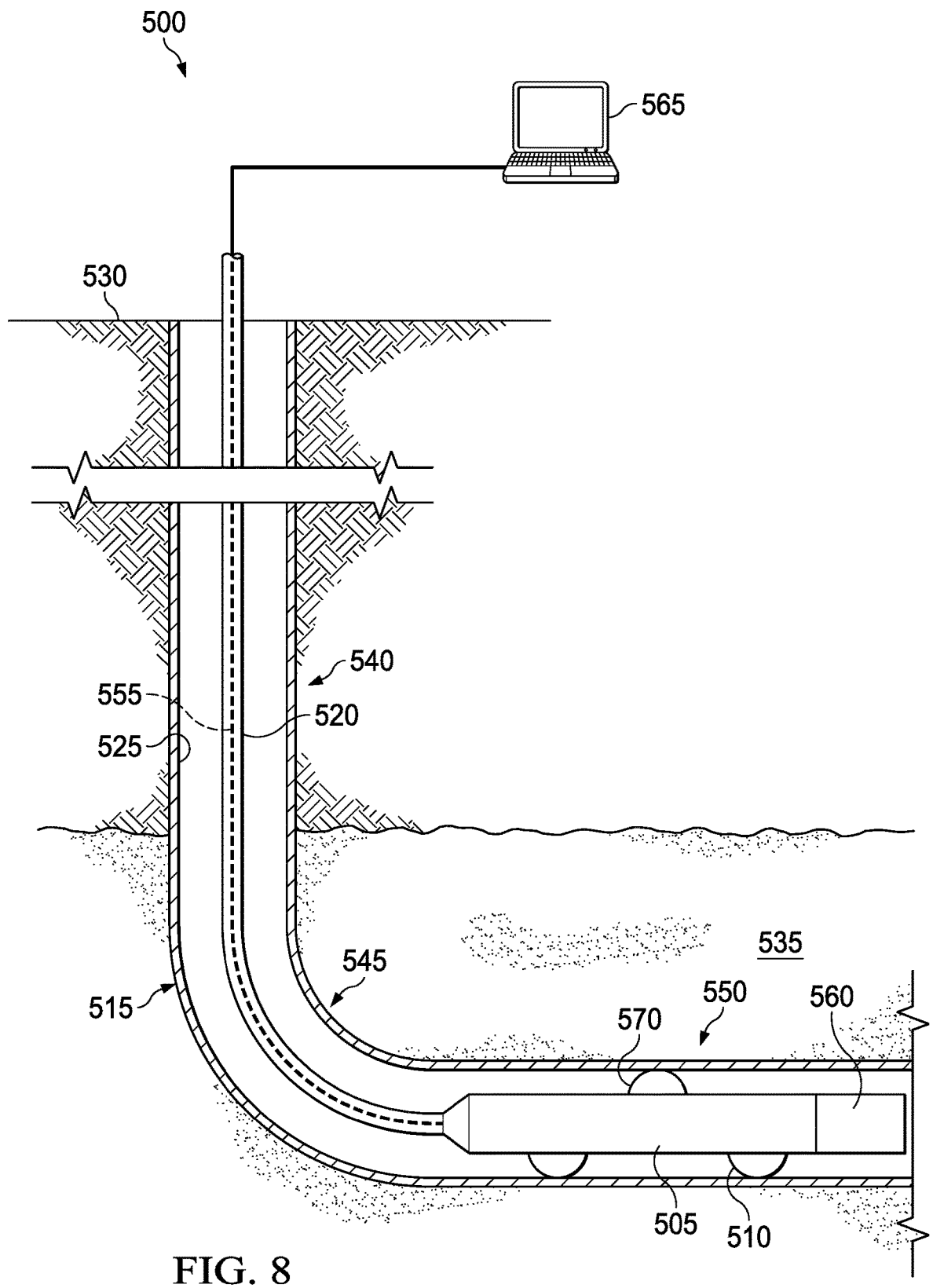
FIG. 8 is an illustration of a schematic of an example downhole tractoring system comprising an example of a downhole tractor in accordance with one or more examples described herein.

FIG. 8 illustrates a schematic of an example downhole tractoring system 500 comprising an example of a downhole tractor 505. Downhole tractor 505 comprises a tractor wheel 510 as described herein. For example, tractor wheel 510 may comprise any of tractor wheel 5, tractor wheel 100, and/or tractor wheel 200 as described in FIGS. 1A-5C. Moreover, the tractor wheel 510 may comprise a tractor tread as described herein. For example, tractor wheel 510 may comprise tractor tread 300 and/or tractor tread 400 as described in FIGS. 6A-7B. The downhole tractor 505 is operable at a variety of speed/force combinations during a tractoring run into and through the illustrated wellbore 515. Although three tractor wheels 510 are illustrated in FIG. 8, the downhole tractor 505 may include more or less wheels, as appropriate. One or more wheels may be powered by wheel assemblies for propelling the downhole tractor 505 through the wellbore 515 in order to run a wireline 520 into the wellbore 515. Other tractor wheels 510 or wheel assemblies of the downhole tractor 505 may not be powered but instead may be freely rotatable in contact with the conduit 525 during operation of the downhole tractor 505.

The illustrated downhole tractoring system 500 includes the downhole tractor 505 coupled to a length of wireline 520 and positioned in a conduit 525 (e.g., a casing) disposed within wellbore 515. The illustrated wellbore 515 is a deviated wellbore that is formed to extend from the surface 530 to a subterranean formation 535 (e.g., a hydrocarbon bearing geologic formation) and includes a vertical portion 540, a heel 545, a horizontal portion 550, and a toe (not illustrated). Although portions 540 and 550 are referred to as "vertical" and "horizontal," respectively, it should be appreciated that such wellbore portions may not be exactly vertical or horizontal, but instead may be substantially vertical or horizontal to account for drilling operations. Further, the wellbore 515 may be cased as illustrated or may be an uncased open hole. The wellbore 515 may comprise both cased and uncased regions. The conduit 525 may be a casing, an open hole portion of the wellbore 515, any type of workstring, any type of tubing, etc.

Wireline 520 extending from the surface 530 to the downhole tractor 505 may be used to conduct electrical power and control signals to and from the downhole tractor 505 via a single-strand or a multi-strand conductor 555 that is run through the wireline 520 downhole to the downhole tractor 505. In some examples, the wireline 520 may be an electrical cable to lower tools (e.g., the downhole tractor 505 and/or other downhole tools) into the wellbore 515 and to facilitate the transmission of power and data. The wireline 520, in some examples, may be a conductor for electric logging and cables incorporating electrical conductors.

In the illustrated example, the downhole tractor 505 is coupled to a downhole tool 560, which may be, for example, a shifting tool, a logging tool, an explosive tool (e.g., a perforating gun or otherwise), a packer, or any other type of downhole tool or other payload.

The illustrated wireline 520 is connected to a surface/control system 565 provided to perform a variety of control and data acquisition functions, such as controlling the power supply to the downhole tractor 505, receiving and determining forces acting on the downhole tractor 505 sensed by one or more sensors in the downhole tractor 505, and retrieving and displaying data obtained by various sensors in the downhole tractor 505.

Although FIG. 8 describes the use of a downhole tractor 505 to convey a wireline downhole, it is to be understood that the examples and principles of the disclosure described herein are also applicable to other types of downhole conveyance methods and systems. For example, the downhole tractor 505 may be used to convey tubing, for example, coiled tubing into laterals and other wellbores so as to prevent buckling of the coiled tubing.

It should be clearly understood that the example downhole tractoring system 500 illustrated by FIG. 8 is merely a general application of the principles of this disclosure in practice, and a wide variety of other examples are possible. Therefore, the scope of this disclosure is not limited in any manner to the details of FIG. 8 as described herein.

It is to be recognized that the disclosed tractor wheels and methods of use thereof may directly or indirectly affect the various downhole equipment and tools that may contact the tractor wheels disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1A-8.

Provided are tractor wheels for a downhole tractor in accordance with the disclosure and the illustrated FIGs. An example tractor wheel comprises a series of continuous springs disposed on the circumference of the tractor wheel, wherein the individual continuous springs in the series of continuous springs are separated by a gap, and a void disposed on the interior of the tractor wheel and that is continuous about the circumference of the tractor wheel. Additionally or alternatively, the tractor wheel may include one or more of the following features individually or in combination. The tractor wheel may further comprise a series of discontinuous springs disposed on the interior of the tractor wheel; wherein each discontinuous spring is discontinuous in that it comprises two separate members that face each other. The void may be filled with a filler material comprising a rubber, a rubber and metal composite, or any combination thereof. The void may be a first void; and wherein the tractor wheel further comprises a second void disposed between the series of continuous springs and the series of discontinuous springs. The first void may be filled with a filler material comprising a rubber, a rubber and metal composite, or any combination thereof. The tractor wheel may further comprise a series of discontinuous springs; wherein the individual continuous springs in the series of continuous springs alternate with the individual discontinuous springs in the series of discontinuous springs; wherein at least a portion of the continuous springs are coupled to a body of the tractor wheel. The tractor wheel may further comprise a tread comprising a series of alternating forward-facing raised curves and backward-facing raised curves having terminal ends; wherein the terminal ends of each forward-facing raised curve is disposed in the open bend of each adjacent backward-facing raised curve; wherein the terminal ends of each backward-facing raised curve is disposed in the open bend of each adjacent forward-facing raised curve. The tractor wheel may further comprise a tread comprising a continuous serpentine-shaped raised curve with raised posts disposed in each open bend.

Provided are methods for tractoring in a wellbore in accordance with the disclosure and the illustrated FIGs. An example method comprises providing a downhole tractor comprising a tractor wheel comprising: a series of continuous springs disposed on the circumference of the tractor wheel, wherein the individual continuous springs in the series of continuous springs are separated by a gap, and a void disposed on the interior of the tractor wheel and that is continuous about the circumference of the tractor wheel; introducing the downhole tractor into the wellbore; and propelling the downhole tractor in the wellbore.

Additionally or alternatively, the method may include one or more of the following features individually or in combination. The tractor wheel may further comprise a series of discontinuous springs disposed on the interior of the tractor wheel; wherein each discontinuous spring is discontinuous in that it comprises two separate members that face each other. The void may be filled with a filler material comprising a rubber, a rubber and metal composite, or any combination thereof. The void may be a first void; and wherein the tractor wheel further comprises a second void disposed between the series of continuous springs and the series of discontinuous springs. The first void may be filled with a filler material comprising a rubber, a rubber and metal composite, or any combination thereof. The tractor wheel may further comprise a series of discontinuous springs; wherein the individual continuous springs in the series of continuous springs alternate with the individual discontinuous springs in the series of discontinuous springs; wherein at least a portion of the continuous springs are coupled to a body of the tractor wheel. The tractor wheel may further comprise a tread comprising a series of alternating forward-facing raised curves and backward-facing raised curves having terminal ends; wherein the terminal ends of each forward-facing raised curve is disposed in the open bend of each adjacent backward-facing raised curve; wherein the terminal ends of each backward-facing raised curve is disposed in the open bend of each adjacent forward-facing raised curve. The tractor wheel may further comprise a tread comprising a continuous serpentine-shaped raised curve with raised posts disposed in each open bend. The wellbore may comprise a conduit; wherein the tractor wheel contacts the surface of the conduit; wherein the conduit comprises an open hole portion of the wellbore, a casing, or a tubing. The tractor wheel may further comprise a series of discontinuous springs disposed on the interior of the tractor wheel; wherein each discontinuous spring is discontinuous in that it comprises two separate members that face each other; wherein the void is a first void; and wherein the tractor wheel further comprises a second void disposed between the series of continuous springs and the series of discontinuous springs. The tractor wheel may further comprise a series of discontinuous springs; wherein the individual continuous springs in the series of continuous springs alternate with the individual discontinuous springs in the series of discontinuous springs; and wherein at least a portion of the continuous springs are coupled to a body of the tractor wheel. The void may be filled with a filler material comprising a rubber, a rubber and metal composite, or any combination thereof. The tractor wheel may further comprise a tread comprising a series of alternating forward-facing raised curves and backward-facing raised curves having terminal ends; wherein the terminal ends of each forward-facing raised curve is disposed in the open bend of each adjacent backward-facing raised curve; and wherein the terminal ends of each backward-facing raised curve is disposed in the open bend of each adjacent forward-facing raised curve. The tractor wheel may further comprise a tread comprising a continuous serpentine-shaped raised curve with raised posts disposed in each open bend.

Provided are systems for tractoring in a wellbore in accordance with the disclosure and the illustrated FIGs. An example system comprises a downhole tractor comprising a tractor wheel comprising: a series of continuous springs disposed on the circumference of the tractor wheel, wherein the individual continuous springs in the series of continuous springs are separated by a gap, and a void disposed on the interior of the tractor wheel and that is continuous about the circumference of the tractor wheel; and a conduit disposed in the wellbore; wherein the tractor wheel is configured to contact the surface of the conduit; wherein the conduit comprises an open hole portion of the wellbore, a casing, or a tubing.

Additionally or alternatively, the system may include one or more of the following features individually or in combination. The tractor wheel may further comprise a series of discontinuous springs disposed on the interior of the tractor wheel; wherein each discontinuous spring is discontinuous in that it comprises two separate members that face each other. The void may be filled with a filler material comprising a rubber, a rubber and metal composite, or any combination thereof. The void may be a first void; and wherein the tractor wheel further comprises a second void disposed between the series of continuous springs and the series of discontinuous springs. The first void may be filled with a filler material comprising a rubber, a rubber and metal composite, or any combination thereof. The tractor wheel may further comprise a series of discontinuous springs; wherein the individual continuous springs in the series of continuous springs alternate with the individual discontinuous springs in the series of discontinuous springs; wherein at least a portion of the continuous springs are coupled to a body of the tractor wheel. The tractor wheel may further comprise a tread comprising a series of alternating forward-facing raised curves and backward-facing raised curves having terminal ends; wherein the terminal ends of each forward-facing raised curve is disposed in the open bend of each adjacent backward-facing raised curve; wherein the terminal ends of each backward-facing raised curve is disposed in the open bend of each adjacent forward-facing raised curve. The tractor wheel may further comprise a tread comprising a continuous serpentine-shaped raised curve with raised posts disposed in each open bend. The wellbore may comprise a conduit; wherein the tractor wheel contacts the surface of the conduit; wherein the conduit comprises an open hole portion of the wellbore, a casing, or a tubing. The tractor wheel may further comprise a series of discontinuous springs disposed on the interior of the tractor wheel; wherein each discontinuous spring is discontinuous in that it comprises two separate members that face each other; wherein the void is a first void; and wherein the tractor wheel further comprises a second void disposed between the series of continuous springs and the series of discontinuous springs. The tractor wheel may further comprise a series of discontinuous springs; wherein the individual continuous springs in the series of continuous springs alternate with the individual discontinuous springs in the series of discontinuous springs; and wherein at least a portion of the continuous springs are coupled to a body of the tractor wheel. The void may be filled with a filler material comprising a rubber, a rubber and metal composite, or any combination thereof. The tractor wheel may further comprise a tread comprising a series of alternating forward-facing raised curves and backward-facing raised curves having terminal ends; wherein the terminal ends of each forward-facing raised curve is disposed in the open bend of each adjacent backward-facing raised curve; and wherein the terminal ends of each backward-facing raised curve is disposed in the open bend of each adjacent forward-facing raised curve. The tractor wheel may further comprise a tread comprising a continuous serpentine-shaped raised curve with raised posts disposed in each open bend.

The preceding description provides various examples of the systems and methods of use disclosed herein which may contain different method steps and alternative combinations of components. It should be understood that although individual examples may be discussed herein the present disclosure covers all combinations of the disclosed examples, including, without limitation, the different component combinations, method step combinations, and properties of the system. It should be understood that the compositions and methods are described in terms of "comprising," "containing," or "including" various components or steps. The compositions and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A tractor wheel for a downhole tractor, the tractor wheel comprising:
    a series of continuous springs disposed on the circumference of the tractor wheel, wherein the individual continuous springs in the series of continuous springs are separated by a gap,
    a void disposed on the interior of the tractor wheel and that is continuous about the circumference of the tractor wheel, and
    a series of discontinuous springs disposed on the interior of the tractor wheel; wherein each discontinuous spring is discontinuous in that it comprises two separate members that face each other.

2. The tractor wheel of claim 1, wherein the void is a first void; and wherein the tractor wheel further comprises a second void disposed between the series of continuous springs and the series of discontinuous springs.

3. The tractor wheel of claim 2, wherein the first void is filled with a filler material comprising a rubber or a rubber and metal composite.

4. The tractor wheel of claim 1, wherein the void is filled with a filler material comprising a rubber or a rubber and metal composite.

5. The tractor wheel of claim 1, wherein the individual continuous springs in the series of continuous springs alternate with the individual discontinuous springs in the series of discontinuous springs; wherein at least a portion of the continuous springs are coupled to a body of the tractor wheel.

6. The tractor wheel of claim 5, wherein the void is filled with a filler material comprising a rubber or a rubber and metal composite.

7. The tractor wheel of claim 1, further comprising a tread comprising a series of alternating forward-facing raised curves and backward-facing raised curves having terminal ends; wherein the terminal ends of each forward-facing raised curve is disposed in the open bend of each adjacent backward-facing raised curve; wherein the terminal ends of each backward-facing raised curve is disposed in the open bend of each adjacent forward-facing raised curve.

8. The tractor wheel of claim 1, further comprising a tread comprising a continuous serpentine-shaped raised curve with raised posts disposed in each open bend.

9. A method for tractoring in a wellbore, the method comprising:
    providing a downhole tractor comprising a tractor wheel comprising:
        a series of continuous springs disposed on the circumference of the tractor wheel, wherein the individual continuous springs in the series of continuous springs are separated by a gap,
        a void disposed on the interior of the tractor wheel and that is continuous about the circumference of the tractor wheel; and
        a tread comprising a series of alternating forward-facing raised curves and backward-facing raised curves having terminal ends; wherein the terminal ends of each forward-facing raised curve is disposed in the open bend of each adjacent backward-facing raised curve; and wherein the terminal ends of each backward-facing raised curve is disposed in the open bend of each adjacent forward-facing raised curve;
    introducing the downhole tractor into the wellbore; and
    propelling the downhole tractor in the wellbore.

10. The method of claim 9, wherein the wellbore comprises a conduit; wherein the tractor wheel contacts the surface of the conduit; wherein the conduit comprises an open hole portion of the wellbore, a casing, or a tubing.

11. The method of claim 9, wherein the tractor wheel further comprises a series of discontinuous springs disposed on the interior of the tractor wheel; wherein each discontinuous spring is discontinuous in that it comprises two separate members that face each other; wherein the void is a first void; and wherein the tractor wheel further comprises a second void disposed between the series of continuous springs and the series of discontinuous springs.

12. The method of claim 9, wherein the tractor wheel further comprises a series of discontinuous springs; wherein the individual continuous springs in the series of continuous springs alternate with the individual discontinuous springs in the series of discontinuous springs; and wherein at least a portion of the continuous springs are coupled to a body of the tractor wheel.

13. The method of claim 9, wherein the void is filled with a filler material comprising a rubber or a rubber and metal composite.

14. The method of claim 9, further comprising a tread comprising a continuous serpentine-shaped raised curve with raised posts disposed in each open bend.

15. A system for tractoring in a wellbore, the system comprising:
   a downhole tractor comprising a tractor wheel comprising:
      a series of continuous springs disposed on the circumference of the tractor wheel, wherein the individual continuous springs in the series of continuous springs are separated by a gap, and
      a void disposed on the interior of the tractor wheel and that is continuous about the circumference of the tractor wheel;
      a tread comprising a series of alternating forward-facing raised curves and backward-facing raised curves having terminal ends; wherein the terminal ends of each forward-facing raised curve is disposed in the open bend of each adjacent backward-facing raised curve; and wherein the terminal ends of each backward-facing raised curve is disposed in the open bend of each adjacent forward-facing raised curve; and
   a conduit disposed in the wellbore; wherein the tractor wheel is configured to contact the surface of the conduit; wherein the conduit comprises an open hole portion of the wellbore, a casing, or a tubing.

16. The system of claim 15, wherein the tractor wheel further comprises a series of discontinuous springs disposed on the interior of the tractor wheel; wherein each discontinuous spring is discontinuous in that it comprises two separate members that face each other; wherein the void is a first void; and wherein the tractor wheel further comprises a second void disposed between the series of continuous springs and the series of discontinuous springs.

17. The system of claim 15, wherein the tractor wheel further comprises a series of discontinuous springs; wherein the individual continuous springs in the series of continuous springs alternate with the individual discontinuous springs in the series of discontinuous springs; and wherein at least a portion of the continuous springs are coupled to a body of the tractor wheel.

18. The tractor wheel of claim 4, wherein the rubber and metal composite is a wire mesh.

19. The method of claim 13, wherein the rubber and metal composite is a wire mesh.

20. The system of claim 15, wherein the void is filled with a filler material comprising a rubber or a rubber and metal composite.

* * * * *